(12) United States Patent
Buratto et al.

(10) Patent No.: US 9,376,142 B2
(45) Date of Patent: Jun. 28, 2016

(54) VEHICLE SUPPORT STRUCTURE

(71) Applicant: Nissan North America, Inc., Franklin, TN (US)

(72) Inventors: Joseph Buratto, Beverly Hills, MI (US); Paul Dyde, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 15 days.

(21) Appl. No.: 14/285,336

(22) Filed: May 22, 2014

(65) Prior Publication Data

US 2015/0336618 A1    Nov. 26, 2015

(51) Int. Cl.
*B62D 24/00* (2006.01)
*B62D 21/02* (2006.01)
*B62D 24/02* (2006.01)

(52) U.S. Cl.
CPC ............ *B62D 24/00* (2013.01); *B62D 21/02* (2013.01); *B62D 24/02* (2013.01)

(58) Field of Classification Search
CPC ...... B62D 25/20; B62D 24/00; B62D 21/157; B62D 24/02; B62D 21/02
USPC ........................................ 296/187.08, 187.12
See application file for complete search history.

(56) References Cited

U.S. PATENT DOCUMENTS

| | | | |
|---|---|---|---|
| 5,267,630 A | 12/1993 | Watanabe et al. | |
| 6,276,484 B1 | 8/2001 | Evans et al. | |
| 6,398,292 B2* | 6/2002 | Tsuruta et al. | 296/187.09 |
| 7,281,755 B2 | 10/2007 | Coakley | |
| 7,404,594 B2 | 7/2008 | Coakley | |
| 8,267,468 B2 | 9/2012 | Amir et al. | |
| 2001/0002761 A1 | 6/2001 | Tsuruta et al. | |
| 2003/0085590 A1 | 5/2003 | Polzer et al. | |
| 2011/0254319 A1 | 10/2011 | Amir et al. | |

FOREIGN PATENT DOCUMENTS

| | | | | |
|---|---|---|---|---|
| DE | EP 1304281 A2 * | 4/2003 | ......... | B62D 21/157 |
| GB | 2340801 A | 3/2000 | | |

* cited by examiner

*Primary Examiner* — Glenn Dayoan
*Assistant Examiner* — Melissa A Black
(74) *Attorney, Agent, or Firm* — Global IP Counselors, LLP (57) ABSTRACT

A vehicle support structure including a vehicle floor, a vehicle frame and a restraining member. The vehicle floor includes a structural member rigidly attached to a lower surface of the vehicle floor. The vehicle frame is attached to the vehicle floor and includes a frame member that extends adjacent to and spaced apart from the structural member. The restraining member has a first end section attached to a first side of the structural member, a second end section attached to a second side of the structural member, and a restraining section extending from the first end section to the second end section. The restraining member at least partially encircles the frame member and is spaced apart from the frame member with a limited range of non-contacting movement between the restraining member and the frame member.

21 Claims, 5 Drawing Sheets

VEHICLE SUPPORT STRUCTURE

BACKGROUND

1. Field of the Invention

The present invention generally relates to a vehicle support structure. More specifically, the present invention relates to a support structure that includes a restraining member fixed to a vehicle floor, the restraining member encircling a frame member such that in response to an impact event, the restraining member limits movement of the frame member relative to the vehicle floor.

2. Background Information

Many vehicles are constructed with a frame assembly and a separate body structure. The frame assembly typically directly supports components such as an engine, a transmission and suspension components. The body structure includes a floor, side wall structures and a roof that define a passenger compartment. The floor of the body structure is typically attached to the frame assembly by, for example, mechanical fasteners. During an impact event, the body structure can undergo movement relative to the frame assembly.

SUMMARY

One object of the disclosure is to provide a restraining member that attaches to a vehicle floor and encircles a frame member such that during an impact event, the restraining member restricts relative movement between the frame member and the vehicle floor.

In view of the state of the known technology, one aspect of the disclosure is to provide a vehicle support structure with a vehicle floor, a vehicle frame and a restraining member. The vehicle floor includes a structural member rigidly attached to a lower surface of the vehicle floor. The vehicle frame is attached to the vehicle floor and includes a frame member that extends adjacent to and spaced apart from the structural member. The restraining member has a first end section attached to a first side of the structural member, a second end section attached to a second side of the structural member, and a restraining section extending from the first end section to the second end section. The restraining member at least partially encircles the frame member and is spaced apart from the frame member with a limited range of non-contacting movement between the restraining member and the frame member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
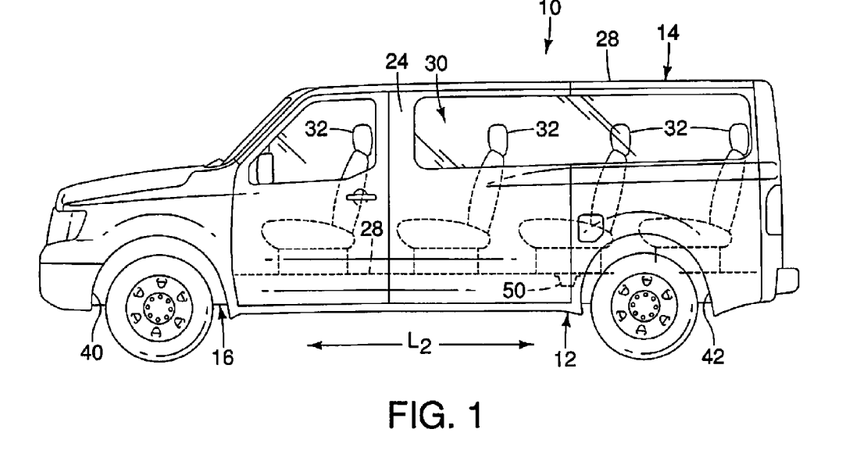
FIG. 1 is a side view of a vehicle that includes a body structure, a frame assembly and a restraining member in accordance with one embodiment.
Figure 2:
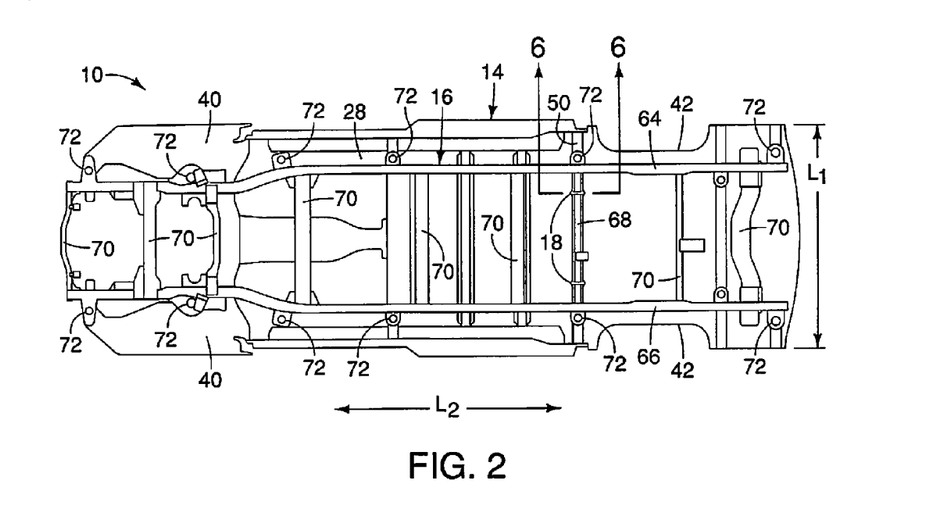
FIG. 2 is a bottom view of the vehicle with tires and suspension elements removed showing the frame assembly, a floor of the body structure and a two restraining members in accordance with the one embodiment.
Figure 3:
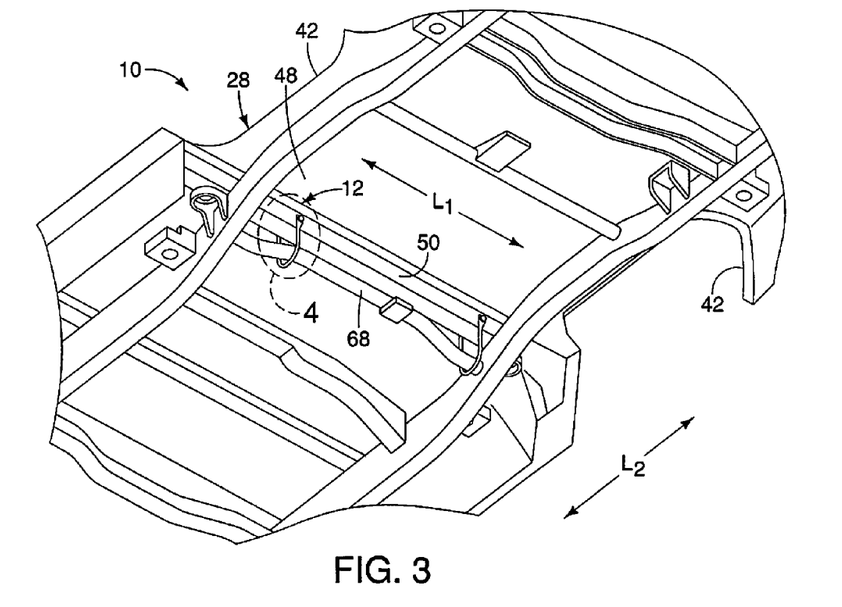
FIG. 3 is a perspective view of an underside of the vehicle showing a portion of the floor of the body structure, a portion of the frame assembly and the restraining members in accordance with the one embodiment.

Referring initially to FIGS. 1 and 2, a vehicle 10 is illustrated in accordance with a first embodiment. The vehicle 10 includes a vehicle support structure 12 defined by portion of a vehicle body structure 14, a frame assembly 16 and at least one restraining assembly 18.

The vehicle body structure 14 includes at least side body panels 24 (only one is visible in FIG. 1), a roof assembly 26 and a floor 28 that together define a passenger compartment 30. A plurality of seat assemblies 32 within the passenger compartment 30 are fixed to the floor 28 in a conventional manner, for instance via mechanical fasteners.

The vehicle body structure 14 includes front wheel wells 40 and rear wheel wells 42. The frame assembly 16 can be seen in FIG. 1 within the front wheel wells 40 and the rear wheel wells 42.

The floor 28 can be a single panel or can be a series of panels welded together to form the floor 28. As shown in FIGS. 2-6, the floor 28 includes at least one floor panel 48 and a structural member 50 that extends in a vehicle lateral direction $L_1$. As shown in FIGS. 5 and 6, the structural member 50 has a U-shape in cross-section such that a hollow space is defined between the structural member 50 and the floor panel 48. Thus, the structural member 50 and the floor panel 48 define a beam that stiffens and supports the overall structure of the floor 28 and the contents of the passenger compartment 30.

As shown in FIG. 6, the structural member 50 includes a first flange portion 52, a second flange portion 54, a front section 56, a bottom section 58 and a rear section 60 that all extend in the vehicle lateral direction $L_1$ from a first side of the vehicle 10 to a second side of the vehicle 10. The first flange portion 52 and the second flange portion 54 are rigidly fixed to a lower surface 48a of the floor 28 by, for example, welding. The front section 56 has a frontward facing surface 56a and the rear section 60 has a rearward facing surface 60a. The frontward facing surface 56a and the rearward facing surface 60a are inclined relative to a vertical direction V. More specifically, the frontward facing surface 56a and the rearward facing surface 60a extend toward one another in a downwardly direction such that an upper edge of the frontward facing surface 56a and an upper edge of the rearward facing surface 60a are spaced apart from one another by a first distance $D_1$, and a lower edge of the frontward facing surface 56a and a lower edge of the rearward facing surface 60a are spaced apart from one another by a second distance $D_2$ that is less than the first distance $D_1$.

Preferably, the frontward facing surface 56*a* and the rearward facing surface 60*a* are inclined by an angle A that is between 2 degrees and 10 degrees relative to the vertical direction. In the depicted embodiment, the angle A is approximately 5 degrees.

It should be understood from the drawings and the description herein that the floor 28 includes other structural members similar to the structural member 50. Since these other structural members are basically the same or similar to the structural member 50, description is omitted for the sake of brevity.

As shown in FIG. 1, one of the seat assemblies 32 is fixed to the floor 28 adjacent to the structural member 50. The seat assemblies 32 are fixed to an upper surface 48*b* of the floor panel 48, opposite the lower surface 48*a* of the floor panel 48 to which the structural member 50 is attached.

Referring now to FIG. 2, a description of the frame assembly 16 is now provided. The frame assembly 16 includes a first side member 64, a second side member 66, a first frame member 68 and a plurality of second frame members 70.

The first side member 64 and the second side member 66 extend in a vehicle longitudinal direction $L_2$ along opposite lateral sides of the vehicle floor 28. Each of the first side member 64 and the second side member 66 includes a plurality of rigid flange portions 72 that extend laterally outboard from the first side member 64 and the second side member 66. The flange portions 72 are fixedly attached to the floor 28 by, for example, mechanical fasteners such as threaded bolts and nuts. The mechanical fasteners used to attach the flange portions 72 to the floor 28 typically have a large diameter and are able to withstand forces associated with commercial vehicles with heavy load capacities. Since mechanical fasteners are conventional structural elements, further description is omitted for the sake of brevity.

The first frame member 68 and the plurality of second frame members 70 all extend in the vehicle lateral direction $L_1$ from the first side member 64 to the second side member 66. Further, the first frame member 68 and the plurality of second frame members 70 extend in directions perpendicular to the first side member 64 and the second side member 66. The first frame member 68 and the plurality of second frame members 70 are all rigidly fixed to the first side member 64 and the second side member 66 by, for example, welding techniques. In other words, the first frame member 68, the plurality of second frame members 70, the first side member 64 and the second side member 66 define a rigid structure that supports the vehicle 10. It should be understood from the drawings and the description herein that all suspension and drive train components have been removed in FIG. 2 to clearly show the various areas of the underside of the floor 28 and the frame assembly 16.

The plurality of second frame members 70 are not necessarily all the same. As shown in FIG. 2, the second frame members 70 can have a variety of shapes and contours depending upon their location under the floor 28. Since many of these shapes and configurations of the second frame members 70 are conventional, further description is omitted for the sake of brevity.

As shown in FIGS. 3-6, the first frame member 68 extends from the first side member 64 to the second side member 66 and has a round shape in cross-section. However the first frame member 68 is not required to be straight, but can have a bent or contoured shape extending from side to side. A first end of the first frame member 68 is rigidly fixed to the first side member 64 and a second end of the first frame member 68 is rigidly fixed to the second side member 66 by, for example, welding.

The first frame member 68 extends in the vehicle lateral direction $L_1$ adjacent to and spaced apart from the structural member 50. As shown in FIGS. 2 and 6, the structural member 50 and the first frame member 68 extend parallel to one another in the vehicle lateral direction $L_1$ relative to the floor 28. Further, the first frame member 68 extends beneath the structural member 50.

Figure 4:
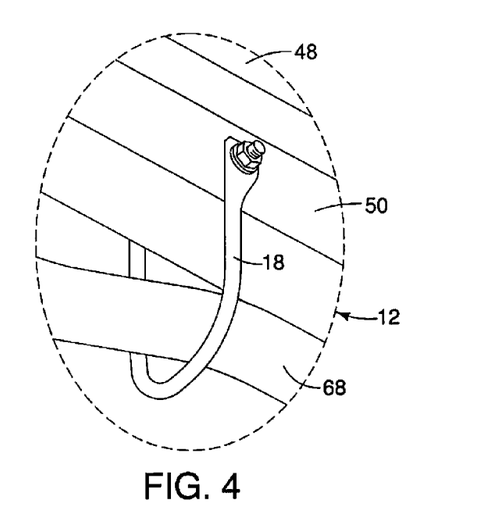
FIG. 4 is a perspective view of one of the restraining members attached to the floor of the body structure and encircling a frame member of the frame assembly in accordance with the one embodiment.
Figure 5:
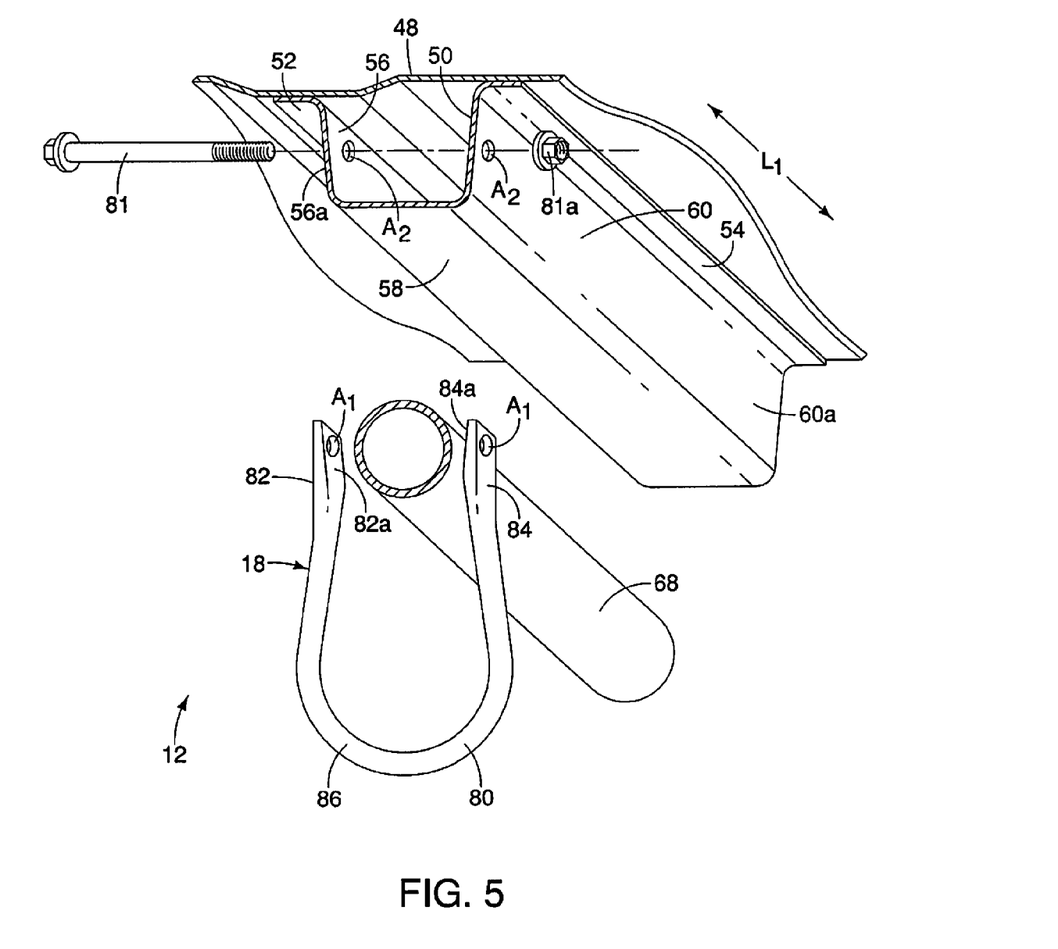
FIG. 5 is an exploded perspective view of a portion of the underside of the vehicle showing the restraining member, the floor of the body structure and the frame member of the frame assembly in accordance with the one embodiment.
Figure 6:
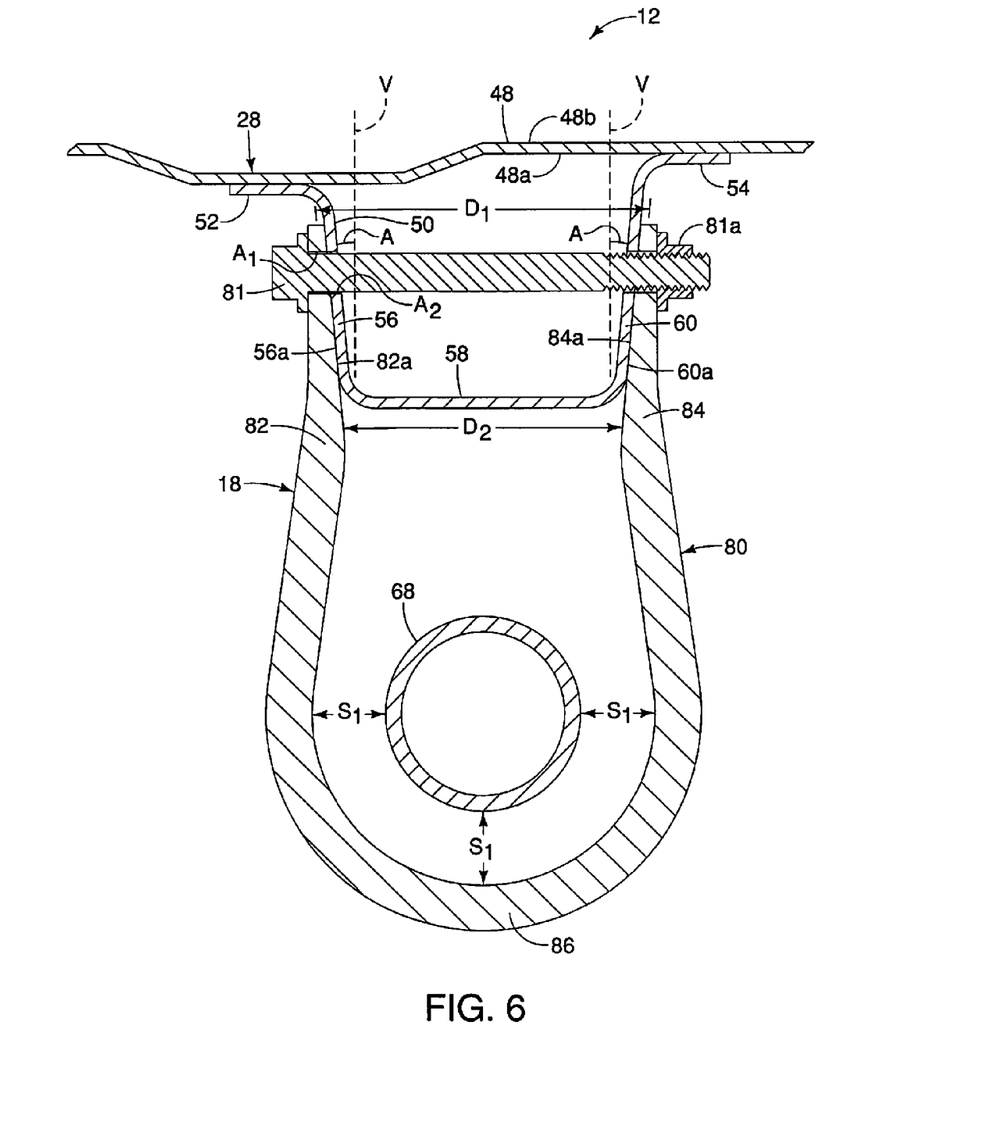
FIG. 6 is a cross-sectional view of the restraining member, the floor of the body structure, the frame member of the frame assembly and a fastening structure taken along the line 6-6 in FIG. 2, where the fastening structure includes a mechanical fastener in accordance with the one embodiment.

A description of one of the restraining assemblies 18 is now provided with specific reference to FIGS. 4, 5 and 6. There are a plurality of restraining members 18 attached to the vehicle 10. In the depicted embodiment, only two of restraining members 18 are depicted. However, it should be understood from the drawings and the description herein that the restraining members 18 can be installed to any of a variety of locations to the floor 28 encircling a corresponding one of the second frame members 70. Since each of the restraining assemblies 18 are similar or identical to one another, description of one applies to all, for the sake of brevity.

Figure 7:
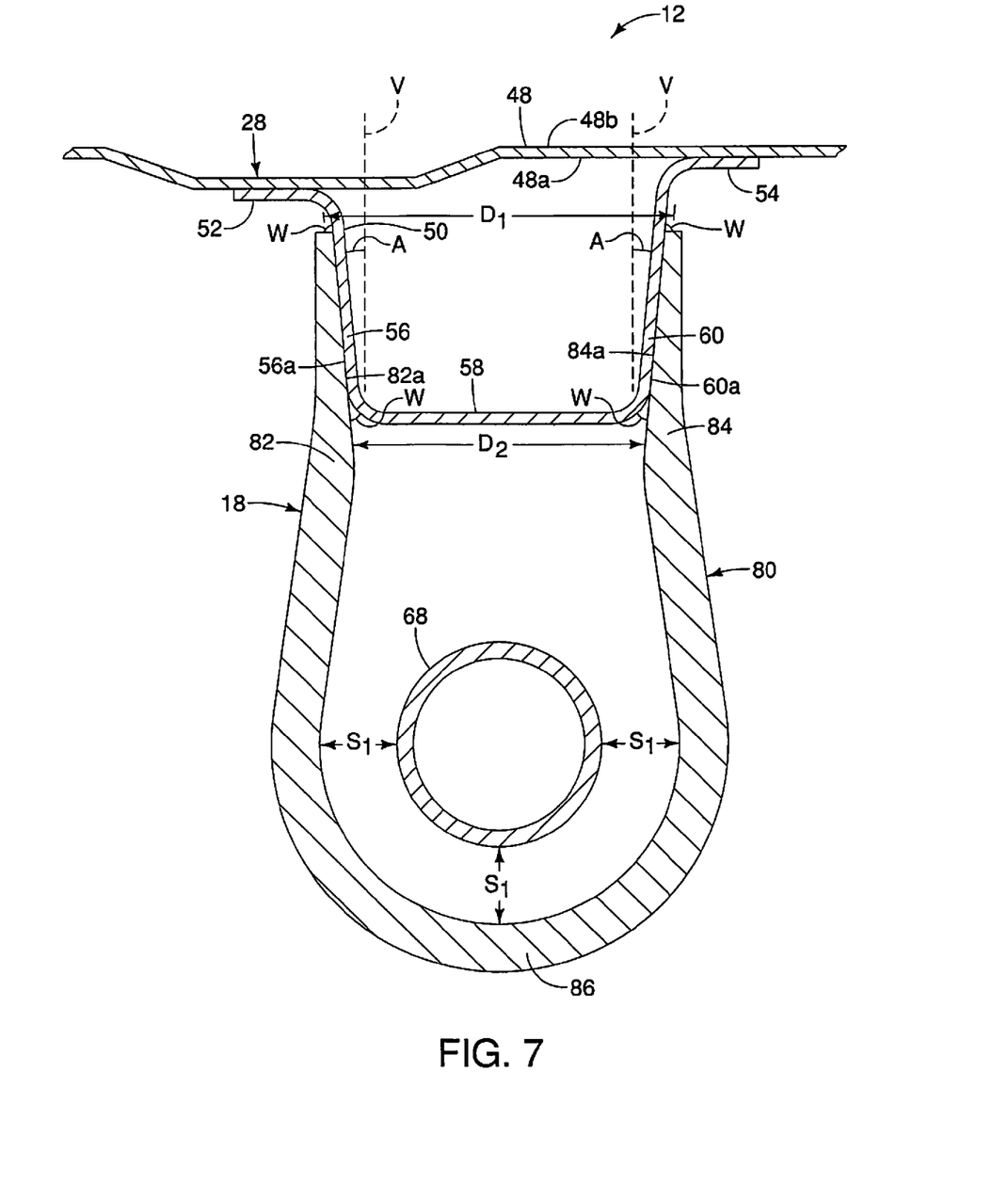
FIG. 7 is another cross-sectional view similar to FIG. 6 showing the restraining member, the floor of the body structure, the frame member of the frame assembly and a fastening structure, where the fastening structure includes welding sites in accordance with a modification to the one embodiment.

The restraining assembly 18 basically includes a restraining member 80 and a fastening structure, such as a fastener 81 shown in FIG. 6 or welds W shown in FIG. 7. The restraining member 80 has a first end section 82, a second end section 84 and a restraining section 86 that extends from the first end section 82 to the second end section 84. As shown in FIG. 5, the first end section 82 has a tapered contour such that thickness of the first end section 82 decreases moving away from the restraining section 86 of the restraining member 86. The second end section 84 similarly has a tapered contour such that thickness of the second end section 84 decreases moving away from the restraining section 86 of the restraining member 80.

Further as shown in FIG. 6, the first end section 82 includes a first attachment surface 82*a* that is inclined such that the first attachment surface 82*a* mates with the frontward facing surface 56*a* of the structural member 50. As well, the second end section 84 includes a second attachment surface 84*a* that is inclined such that the second attachment surface 84*a* mates with the rearward facing surface 60*a* of the structural member 50.

As shown in FIG. 6, the first end section 82, the second end section 84 and the restraining section 86 of the restraining member 80 are unitarily formed as a single, unitary, monolithic element. Further, the restraining member 80 can be made of a bent metallic bar having a horse-shoe shape as viewed in a direction of a central axis of the first frame member 68.

As mentioned above, the restraining assembly 18 includes the fastening structure in the form of the fastener 81 shown in FIG. 6 or the welds W shown in FIG. 7. As shown in FIGS. 5 and 6, the first end section 82 and the second end section 84 can be fixed to the structural member 50 via the fastener 81. The fastener 81 is an elongated mechanical fastener with external threads and includes a mating internally threaded nut 81*a*. In the depicted embodiment, the internally threaded nut 81*a* is a separate element. However, alternatively, the internally threaded nut 81*a* can be welded to the second end section 84 of the restraining assembly 18 or can be an integral part of the second end section 84, for example, as a threaded aperture formed in the second end section 84. The fastener 81 attaches the restraining member 80 to the structural member 50 at a location adjacent to the first side member 62. Similarly, a second restraining member 80 is attached to the structural member 50 adjacent to the second side member 64. However, it should be understood from the drawings and the description herein that the first end section 82 can alternatively be welded to the frontward facing surface 56*a* of the structural member 50, and the second end section 84 can be welded to the rearward facing surface 60a of the structural member 50, as shown in FIG. 7 with welds W. FIG. 7 shows a modification to the embodiment depicted in FIGS. 5 and 6 where the fastener 81 is replaced with welding sites or welds W. Since welds W and welding techniques in general are conventional, further description is omitted for the sake of brevity.

The fastener 81 extends through apertures $A_1$ in the first end section 82 and the second end section 84, and apertures $A_2$ in the structural member 50. The nut 81a threadedly attaches to the fastener 81, as shown in FIG. 6, fixedly attaching the restraining member 80 to the structural member 50. Further, the fastener 81 clamps the first end section 82 against the structural member 50 and clamps the second end section 84 against the structural member 50. More specifically, the fastener 81 clamps the first attachment surface 82a against the frontward facing surface 56a of the structural member 50 and clamps the second attachment surface 84a against the rearward facing surface 60a of the structural member 50.

Once installed, the restraining member 80 at least partially encircles the first frame member 68 and is spaced apart from the first frame member 68. As shown in FIG. 6, the first frame member 68 is a hollow tube having a circular cross-section. The restraining section 86 of the restraining member 80 has an arcuate shape that partially encircles the first frame member 68 and is equidistantly spaced apart from the first frame member 68 on three orthogonal sides thereof by a distance $S_1$, as shown in FIG. 6. Hence, the arcuate shaped portion of the restraining section 86 is uniformly spaced apart from the first frame member 68 by distances $S_1$ measured in a radial direction relative to the first frame member 68.

As shown in the drawings, the vehicle support structure 12 is basically defined by the structural member 50, the first frame member 68 and the restraining assembly 18 (the restraining member 80 and the fastener 81). The vehicle support structure 12 provides the frame assembly 16 with a limited range of non-contacting movement between the restraining member 80 and the first frame member 68.

The purpose of the vehicle support structure 12 is to allow a very limited amount of relative movement between the restraining member 80 and the first frame member 68 during an impact event. This allows portions of the vehicle 10 to undergo deformation during the impact event thereby absorbing impact energy. However, the inclusion of the restraining assembly 18 in the vehicle support structure 12 serves to limit the relative movement between the frame assembly 16 and the floor 28 during an impact event.

The vehicle drive train and suspension components are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle support structure. Accordingly, these terms, as utilized to describe the present invention should be interpreted relative to a vehicle equipped with the vehicle support structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle support structure comprising:
    a vehicle floor including a structural member rigidly attached to a lower surface of the vehicle floor;
    a vehicle frame attached to the vehicle floor and including a frame member that extends adjacent to and spaced apart from the structural member; and
    a restraining member having a first end section attached to a first side of the structural member, a second end section attached to a second side of the structural member, and a restraining section extending from the first end section to the second end section, with the restraining member at least partially encircling the frame member and being spaced apart from the frame member with a limited range of non-contacting movement between the restraining member and the frame member.

2. The vehicle support structure according to claim 1, wherein
    the structural member and the frame member extend parallel to one another in a vehicle lateral direction relative to the vehicle floor.

3. The vehicle support structure according to claim 1, wherein
    the structural member has a frontward facing surface and a rearward facing surface that are inclined relative to a vertical direction.

4. The vehicle support structure according to claim 3, wherein
    the frontward facing surface and the rearward facing surface downwardly extend toward one another such that an upper edge of the frontward facing surface and an upper edge of the rearward facing surface are spaced apart from one another by a first distance, and a lower edge of the frontward facing surface and a lower edge of the rearward facing surface are spaced apart from one another by a second distance that is less than the first distance.

5. The vehicle support structure according to claim 3, wherein
the frontward facing surface is inclined by an angle that is between 2 degrees and 10 degrees relative to the vertical direction, and
the rearward facing surface is inclined by an angle that is between 2 degrees and 10 degrees relative to the vertical direction.

6. A vehicle support structure comprising:
a vehicle floor including a structural member rigidly attached to a lower surface of the vehicle floor, the structural member having a frontward facing surface and a rearward facing surface that are inclined relative to a vertical direction;
a vehicle frame attached to the vehicle floor and including a frame member that extends adjacent to and spaced apart from the structural member; and
a restraining member having a first end section attached to a first side of the structural member, a second end section attached to a second side of the structural member, and a restraining section extending from the first end section to the second end section, with the restraining member at least partially encircling the frame member and being spaced apart from the frame member with a limited range of non-contacting movement between the restraining member and the frame member, the first end section including a first attachment surface that is inclined such that the first attachment surface mates with the frontward facing surface of the structural member, and the second end section including a second attachment surface that is inclined such that the second attachment surface mates with the rearward facing surface.

7. The vehicle support structure according to claim 6, further comprising
a fastener extending through apertures in the first end section, the structural member, and the second end section and configured to clamp the first attachment surface against the frontward facing surface of the structural member and clamp the second attachment surface against the rearward facing surface of the structural member to fixedly attach the restraining member to the structural member.

8. A vehicle support structure comprising:
a vehicle floor including a structural member rigidly attached to a lower surface of the vehicle floor;
a vehicle frame attached to the vehicle floor and including a frame member that extends adjacent to and spaced apart from the structural member; and
a restraining member having a first end section attached to a first side of the structural member, a second end section attached to a second side of the structural member, and a restraining section extending from the first end section to the second end section, with the restraining member at least partially encircling the frame member and being spaced apart from the frame member with a limited range of non-contacting movement between the restraining member and the frame member, the first end section having a tapered contour such that thickness of the first end section decreases moving away from the restraining section of the restraining member, and the second end section having a tapered contour such that thickness of the second end section decreases moving away from the restraining section of the restraining member.

9. The vehicle support structure according to claim 8, further comprising
a fastener extending through apertures in the first end section, the structural member, and the second end section and configured to clamp a distal end of the first end section and a distal end of the second end section to the structural member to fixedly attach the restraining member to the structural member.

10. The vehicle support structure according to claim 1, wherein
the first end section, the second end section and the restraining section of the restraining member are unitarily formed as a single, unitary, monolithic element.

11. The vehicle support structure according to claim 10, wherein
the restraining member is a bent metallic bar having a horse-shoe shape as viewed in a direction of a central axis of the frame member.

12. The vehicle support structure according to claim 1, wherein
the frame member is a hollow tube having a circular cross-section, and
the restraining section of the restraining member has an arcuate shaped portion that partially encircles the frame member.

13. A vehicle support structure comprising:
a vehicle floor including a structural member rigidly attached to a lower surface of the vehicle floor;
a vehicle frame attached to the vehicle floor and including a frame member that extends adjacent to and spaced apart from the structural member, the frame member being a hollow tube having a circular cross-section; and
a restraining member having a first end section attached to a first side of the structural member, a second end section attached to a second side of the structural member, and a restraining section extending from the first end section to the second end section, with the restraining member at least partially encircling the frame member and being spaced apart from the frame member with a limited range of non-contacting movement between the restraining member and the frame member, the restraining section of the restraining member having an arcuate shaped portion that partially encircles the frame member, the arcuate shaped portion of the restraining section being uniformly spaced apart from the frame member by distances measured in a radial direction relative to the frame member.

14. The vehicle support structure according to claim 1, further comprising
a fastener extending through apertures in the first end section, the structural member, and the second end section and configured to clamp the first end section against the structural member and clamp the second end section against the structural member to fixedly attach the restraining member to the structural member.

15. The vehicle support structure according to claim 1, wherein
the vehicle frame includes a first side member and a second side member that extend in vehicle longitudinal directions along opposite lateral sides of the vehicle floor, the first and second side members being fastened to the vehicle floor, and the frame member extends in a lateral direction from the first side member to the second side member, with a first end of the frame member being rigidly fixed to the first side member and the second end of the frame member being rigidly fixed to the second side member.

16. The vehicle support structure according to claim 15, wherein
the structural member of the vehicle floor extends in a lateral direction.

17. The vehicle support structure according to claim 16, wherein
the frame member extends parallel to and beneath the structural member.

18. The vehicle support structure according to claim 16, wherein
the restraining member is attached to the structural member at a location adjacent to the first side member.

19. The vehicle support structure according to claim 18, further comprising
a second restraining member attached to the structural member at a location adjacent to the second side member.

20. The vehicle support structure according to claim 1, wherein
the frame member includes a first attachment flange attached to a first lateral side of the vehicle floor and a second attachment flange attached to a second lateral side of the vehicle floor opposite to the first lateral side of the vehicle floor with the structural member extending in a lateral direction between the first attachment flange and the second attachment flange, and
the restraining member being located adjacent to one of the first attachment flange and the second attachment flange.

21. The vehicle support structure according to claim 1, wherein
the restraining member encircles the frame member such that the limited range of non-contacting movement between the restraining member and the frame member is in a vehicle lateral direction.

* * * * *